(12) United States Patent
Agrawal et al.

(10) Patent No.: US 8,593,714 B2
(45) Date of Patent: Nov. 26, 2013

(54) COMPOSITE ELECTRODE AND ELECTROLYTES COMPRISING NANOPARTICLES AND RESULTING DEVICES

(75) Inventors: Anoop Agrawal, Tucson, AZ (US); Juan Carlos L. Tonazzi, Tucson, AZ (US)

(73) Assignee: AJJER, LLC, Tucson, AZ (US)

( * ) Notice: Subject to any disclaimer, the term of this patent is extended or adjusted under 35 U.S.C. 154(b) by 386 days.

(21) Appl. No.: 12/468,719

(22) Filed: May 19, 2009

(65) Prior Publication Data

US 2010/0039690 A1 Feb. 18, 2010

Related U.S. Application Data

(60) Provisional application No. 61/054,235, filed on May 19, 2008.

(51) Int. Cl.
*G02F 1/155* (2006.01)
*G02F 1/153* (2006.01)

(52) U.S. Cl.
USPC ........... 359/265; 359/266; 359/268; 359/269; 359/270; 359/271; 359/272; 359/273; 359/274

(58) Field of Classification Search
USPC .................................. 359/265–275
See application file for complete search history.

(56) References Cited

U.S. PATENT DOCUMENTS

| | | | |
|---|---|---|---|
| 4,875,762 A | 10/1989 | Kato et al. | |
| 5,140,455 A | 8/1992 | Varaprasad et al. | |
| 5,179,467 A | 1/1993 | Buchwalter et al. | |
| 5,277,986 A | 1/1994 | Cronin et al. | |
| 5,457,218 A | 10/1995 | Cronin et al. | |
| 5,525,264 A | 6/1996 | Cronin et al. | |
| 5,563,273 A | 10/1996 | Buchwalter et al. | |
| 5,852,509 A | 12/1998 | Coleman | |
| 5,910,854 A | 6/1999 | Varaprasad et al. | |
| 5,989,717 A | 11/1999 | Allemand et al. | |
| 6,016,215 A | 1/2000 | Byker | |
| 6,241,916 B1 | 6/2001 | Claussen et al. | |
| 6,246,505 B1 | 6/2001 | Teowee et al. | |
| 6,266,177 B1 | 7/2001 | Allemand et al. | |
| 6,301,038 B1 | 10/2001 | Fitzmaurice et al. | |
| 6,317,248 B1 | 11/2001 | Agrawal et al. | |

(Continued)

FOREIGN PATENT DOCUMENTS

WO WO2008022966 2/2008

OTHER PUBLICATIONS

Peng, Chuang, et al. "A comparative study on electrochemical co-deposition and capacitance of composite films of conducting polymers and carbon nanotubes." School of Chemical, Environmental and Mining Engineering, University of Nottingham, University Park, Nottingham NG7 2RD, UK. Jul. 12, 2007. www.sciencedirect.com.

(Continued)

*Primary Examiner* — Evelyn A. Lester (57) ABSTRACT

This invention discloses novel electrochromic devices and polymer actuator materials where nanoparticles are used to make composites. In particular, the said nanoparticles are wire shaped and disc shaped. These composites allow EC devices to be made with improved performance, particularly display devices could be made that consume low power and can be manufactured at low cost.

9 Claims, 2 Drawing Sheets

(56) References Cited

U.S. PATENT DOCUMENTS

| | | | |
|---|---|---|---|
| 6,420,036 | B1 | 7/2002 | Varaprasad et al. |
| 6,519,072 | B2 | 2/2003 | Nishikitani et al. |
| 6,767,481 | B2 | 7/2004 | Berneth et al. |
| 6,853,472 | B2 | 2/2005 | Warner et al. |
| 6,879,424 | B2 | 4/2005 | Vincent et al. |
| 6,906,842 | B2 | 6/2005 | Agrawal et al. |
| 6,961,168 | B2 | 11/2005 | Agrawal et al. |
| 7,054,050 | B2 | 5/2006 | Vincent et al. |
| 7,119,937 | B2 | 10/2006 | Warner et al. |
| 7,227,445 | B2 | 6/2007 | Atkinson |
| 7,273,181 | B2 | 9/2007 | White |
| 7,372,609 | B2 | 5/2008 | Lin et al. |
| 7,508,009 | B2 | 3/2009 | Edwards et al. |
| 2006/0215250 | A1* | 9/2006 | Shibuya et al. ............ 359/270 |
| 2006/0284538 | A1 | 12/2006 | Harutyunyan |
| 2007/0074316 | A1 | 3/2007 | Alden et al. |
| 2007/0114621 | A1 | 5/2007 | Wisnudel et al. |
| 2007/0205897 | A1 | 9/2007 | Forster |
| 2008/0009568 | A1 | 1/2008 | Kumar et al. |
| 2008/0012707 | A1 | 1/2008 | Peters et al. |
| 2008/0074724 | A1 | 3/2008 | Agrawal et al. |
| 2008/0100455 | A1 | 5/2008 | Erickson et al. |
| 2011/0267673 | A1* | 11/2011 | Agrawal et al. ............ 359/267 |

OTHER PUBLICATIONS

Ahmad, Shahzada et al. "Electrochromic device based on carbon nanotubes functionalized poly (methyl pyrrole) synthesized in hydrophobic ionic liquid medium." Electronic Material Division, National Physical Laboratory, Dr. K. S. Krishnan Marg. New Delhi 110 012, India. www.elsevier.com/locate/elecom, © 2008.
U.S. Appl. No. 60/998,758.
U.S. Appl. No. 61/025,069.
U.S. Appl. No. 61/078,328, filed Jul. 3, 2008.
U.S. Appl. No. 61/168,421, filed Apr. 10, 2009.
Modern Plastics Encyclopedia (Chemical Week Publishing, NY), list of UV stabilizers enclosed.

* cited by examiner

Figure 3

COMPOSITE ELECTRODE AND ELECTROLYTES COMPRISING NANOPARTICLES AND RESULTING DEVICES

RELATED APPLICATION/CLAIM OF PRIORITY

This application is related to and claims priority from Provisional application Ser. No. 61/054,235 filed May 19, 2008, which provisional application is incorporated by reference herein.

FIELD OF THE INVENTION

The present invention relates to fabrication of electrolytes comprising nanoparticles and use of these electrolytes in fabricating electrochemical devices, particularly electrochromic devices and actuators. These particles are incorporated in electrodes and electrolytes of the devices to enhance their performance.

BACKGROUND OF THE INVENTION

Electrolytes are used for many types of electrochemical devices, some of these are batteries, electrochromic (EC) devices, sensors, actuators, fuel cells and capacitors and solar cells to name a few. Such electrolytes may be solid or liquid. Electrolytes allow the mobility of the ions while restricting electronic conductivity. The electrolytes of this invention comprise nanoparticles. One role of the nanoparticles is to selectively restrict the movement of larger ions as compared to smaller ions. The nanoparticles also reinforce the electrolyte in order to provide superior mechanical properties to the solid electrolytes while providing pathways for ionic movement. To meet the above goals the nanoparticles used in this invention are disc shaped, i.e., their thickness is smaller as compared to their other two dimensions. In discs, the thickness has nano dimensions of about less than 100 nm and preferably below 50 nm and most preferably below 10 nm. The width and length may be nanosized or larger.

The disc shaped nanoparticles may be used in several applications. In EC devices the use of these can lead to decreased thickness of electrolyte layers, ease of fabrication of solid devices and enhanced device performance. The ion mobility in the electrolyte can be selectively decreased for larger ions which could lead to decreased power requirements and hence allow fabrication of low power consumption displays. Another area could be decreased electrolyte thickness in a variety of EC devices and glazing, e.g. in automotive mirrors, thin electrolytes reduce the environmental impact due to reduction in chemicals in electrolytes, which also result in reduced material cost. In electrochemical actuators, reinforcement by these particles may impart high modulus and high elongation characteristics to the electrolytes or the redox electrodes so that the force exerted by reinforced polymers may be increased for equivalent power consumption. Disc shaped nanoparticles may also be used for forming encapsulation layers (or barrier layers) to protect EC or other electrochemical devices from the environment.

Nanowires (or nanorods) of conducting and semiconducting materials may also be used to make composites for fabricating redox electrodes for electrochemical devices with superior properties. In many devices where thick electrodes are used (about 1 μm or thicker), the electronic conductivity may be poor, and the use of such nanowires can overcome the conductivity limitations. In nanowires, the average linear cross-section (e.g. diameter) has nanodimensions of about less than 100 nm and preferably below 50 nm and most preferably below 30 nm.

An object of this invention is to disclose use of nanoparticles in electrochemical devices such as electrochromic devices, batteries, photochromic devices, actuators, etc. to enhance their properties.

Another objective of this invention is to disclose specifics of nanoparticles and their use in electrolytes, electrodes, barrier layers and processing methods to achieve devices with enhanced properties.

SUMMARY OF THE INVENTION

In accordance with the purposes of the present invention, as embodied and broadly described herein, the present invention provides a method of preparation of composite electrolyte and/or electrodes for electrochemical systems comprising of nanoparticles. Use of conductive nanowires in electrochemical electrodes can increase their electronic conductivity which removes a major limitation in their performance with increasing thickness. The disc shaped nanoparticles in electrolytes can provide mechanical reinforcement and a control of the ionic movement. The ionic movement control can lower power consumption in certain EC devices and also provide devices (e.g., displays) with tuned image persistence, which means the duration for which the image/color persists after the activating power is removed. In electrochemical actuators, the mechanical properties of the electrolyte and/or the electrodes provide improved modulus and elongation which results in higher force generation and superior mechanical properties of the device.

DETAILED DESCRIPTION

Nanodiscs:

The layered silicate clays (e.g., montmorillonite, synthetic laponite) have been used to make several new composites with polymers with extraordinary properties, such as high strength and high elongation, high thermal resistance, low flammability and high barrier properties (e.g. see Polymer-Clay Nanocomposites, T. J. Pinnavaia (Editor), G. W. Beall (Editor), Wiley, New York, 2001). All of these arise because the processing of these materials is done in a way so that the clays cleave along atomic planes leaving discs of about a few nm thick (typically 1 nm thick and higher) and with higher width and length (this breakdown or cleavage process along the atomic planes is called exfoliation). Typically, the disc aspect ratio, i.e., both length to thickness and width to thickness is greater than 10, and even greater than 20. These discs in finished polymeric composites arrange themselves in layers with the polymeric chains passing through these layers. These inorganic layers provide reinforcement at the nanoscale to the polymers and improve their mechanical and thermal properties, improve barrier to permeability due to the long tortuous path that diffusing molecules have to take around this plates, which also starves oxygen flow to a material comprising such plates and results in superior flame retardance. As discussed below, addition of nanodiscs to electrolyte layers and in some cases to electrodes may provide several benefits or provide a method to tune the properties of the device.

Nanowires:

The conductive nanowires are typically made out of carbon, metals or conductive semiconductors including metal carbides and metal nitrides. These may also be made by depositing conductive coatings over other materials such as organic fibers. Typically these are from about 1 to 25 nm in diameter, and may be up to 1 to 100 microns in length. Nanowires have been used to make transparent electrodes for electrochromic devices (e.g., see US patent application 2007/0074316 by Alden et al which uses metal nanowires and 2006/0,284,538 which uses carbon nanowires to make transparent conductive coatings). An advantage of nanowires is that it imparts good electronic conductivity by forming a connected mesh at low concentration. Since their diameter is small (below 100 nm), these are not visible and do not distract from any visual appearance of the device. However, these have not been used in formulations of EC and actuator electrodes, where these electrodes undergo redox (oxidation or reduction) reactions. Usually, redox EC layers are used as thin coatings and their electronic conductivity is sufficient for electron transport. However, in many applications redox electrodes are thick (e.g., greater than 1 μm to several mm for actuators), and the electronic conductivity of these electrodes limits their performance. The thick electrodes may comprise of ionically conductive material and the redox material, or the redox material may have poor electronic conductivity at least in one of the oxidation states. To increase the electronic conductivity of these layers one can add nanowires in a concentration so that they form a network and typically touch the conductive electrode (e.g. the transparent conductor). In addition, for actuators, these wires may also provide a mechanical reinforcement which increases the stiffness or/and strength of the electrode. It is preferred that when such nanowires are used they do not participate in the redox activity of the device so that they do not loose their properties or generate any corrosion products.

Electrochromic, Photochromic Coatings and Devices:

There are several types of EC devices, e.g., some have distinct one or two EC redox electrodes separated by an electrolyte layer, or the electrolyte layer with an EC redox material separates the two conductors. The nanoparticles of this disclosure play different roles and they may be also combined in the same device using the various principles that are disclosed here. Many different types of electrochromic and photochromic devices can be improved and are described in U.S. Pat. Nos. 6,906,842; 5,140,455; 5,989,717; 6,246,505; 6,266,177; 6,317,248 and 6,420,036 which are all incorporated by reference herein, particularly as they refer to various devices, designs, applications, materials and the processes used. Photochromic devices that use electrochromic materials are described in U.S. Pat. No. 6,246,505.

One potential application is fabrication of low cost, low power electrochromic displays that is enabled by this invention. For example, in a variety of emerging consumer and industrial products/processes, electrochromic technology is slated to deliver displays for tags or labels on product packaging, passports, payment cards, inventory control, product tracking, animal control, etc. The power available for these is small and may be provided by a wireless coupling, solar cell or an onboard power supply (e.g. see US patent applications 2007/0,114,621; 2008/0,100,455; 2007/0205897 and U.S. Pat. Nos. 7,227,445; 7,273,181). The display may be energized by applying a pulse of power and it may be desired for the display to be persistent or show the information for a long time without consuming any more power. As an example, cafeteria food card, train or bus card may show the amount remaining for several seconds to days when one swipes the card in a reader or walks by a booth with an emitting source during which power is applied. In another application on inventory control, a wireless communication system in a supermarket can interact with any of the desired or all of the product labels on the product package, and then turn an indicator on the package label if it is expired, or is recalled, or needs to go on sale, etc. The information on the display has to remain visible for sufficiently long so that the store employees are able to get to them and take proper action. Thus, depending on the application the period of persistence may differ. These labels have to be low cost and environmental friendly so as not to excessively increase the cost of products, and tags, etc. as these packaging or the tags may be disposed.

Figure 1:
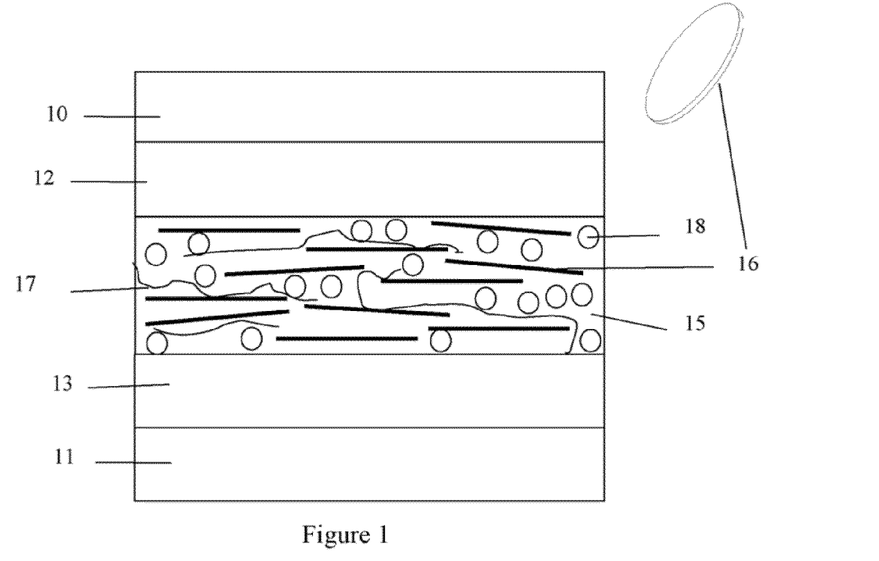
FIG. 1: Schematics of EC devices formed by using electrochromic dyes and disc shaped nanoparticles in the electrolyte.

FIG. 1 shows a schematic of an electrochromic device made by this invention that can have long persistence time when nanodiscs are used in the electrolyte. This device shows an electrolyte (15) embedded between two substrates (10 and 11) that are coated with opposing conductive coatings 12 and 13 and in contact with the electrolyte. This is a sandwich type of construction where a conductive electrodes are placed on the two opposite sides of the electrolyte. The substrates may be rigid or flexible, and at least one of the conductive coatings has to be transparent. The exfoliated clay particles in the electrolyte are shown as flat discs 16 (although they may have other orientations as well). An inset shows these discs, however it is not necessary that they be circular. A polymeric binder in the electrolyte is shown as the wiggly lines 17, and other plasticizers, salts, UV stabilizers and electrochromic dyes (anodic and cathodic, or anodic and cathodic moieties combined in a single dye molecule) are shown as circles 18. When the device is powered at least one of the dyes colors due to a change in oxidation state, e.g. both dyes may color and then the anodic dye close to the anode colors by oxidation and the cathodic dye close to the cathode colors by reduction. If there were no clay particles, the oxidized and the reduced dyes will migrate towards the center of the electrolyte, recombine and bleach. This causes a back reaction that constantly consumes current for as long as the devices are powered to keep them in the colored state. When the power is removed, this back reaction causes the device to self bleach. Addition of the clay nanodiscs causes the oxidized and reduced dyes to take a tortuous path before they can meet thus prolonging the time to bleach, and also lowering the power consumption. Particularly, if the dye ions are large, the kinetics of the back reaction can be substantially reduced. For example, the displays made by this process may remain colored for a long time after the power is removed. The polymer material in the electrolyte layer acts as a binder to provide solid characteristics to the electrolyte and also promotes adhesion to the substrates. These polymer chains may go through the exfoliated layers or just around them. One may also form the polymer by intercalating the discs with a monomer followed by a polymerization reaction, or even form a crosslinked network by in-situ polymerization.

For electrochromic devices with electrolyte possessing EC properties, as shown in FIG. 1, the dye concentration has to be high so that sufficiently high numbers of these molecules are available next to the conducting electrodes. This will ensure that coloration speed is not compromised by pulling too many of the dye molecules by snaking them around the nanoparticles. In other words this device can work and act as if there are additional redox layers inserted between the electrolyte and the conductors.

EC dye composites with layered silicate clays may be formed in many ways. These composites may be used to form electrodes or electrolytes. The discussion below first addresses the electrolytes and devices made from this and later the electrodes are discussed. A general method of making products with these nanodiscs is to exfoliate the larger chunks of clay particles (typically in microns) in the same medium in which these are used so that the nanodiscs do not agglomerate and remain suspended. The electrolytic medium comprises of several ingredients. For typical solid electrolytes for use in EC devices of the type shown in FIG. 1, the ingredients in addition to the EC dye(s) and plasticizers include polymers e.g. acrylics, urethanes, epoxies, fluorinated polymers such as copolymers of polyvinylidene fluoride and fluorinated ethylene propylene. One may also use monomers in the formulation with appropriate initiators and reactants, so that after the coating process, the monomers are converted to polymers (crosslinked or non-crosslinked) where polymerization is initiated by heat and/or a radiation treatment. Some of the plasticizers are carbonates (such as propylene carbonate, ethylene carbonate), esters, polyethylene and polypropylene glycols, phosphates and ionic liquids. A more detailed list of non-ionic plasticizers is given in U.S. Pat. No. 5,140,455, which is included herein by reference. As discussed later, ionic liquids are an important part of the electrolytes in this innovation and their details will be presented later. Electrolyte formulation may also comprise of other ingredients such as dissociable salts (e.g., lithium salts and sodium salts), electrochromic dyes (e.g. compounds comprising viologens, anthracenes, phenazines, ferrocenes and phenothiazines). UV stabilizers (e.g., benzotriazoles, benzophenones, triazines, etc.) are also used, and a more exhaustive list of UV stabilizers may be found in Modern Plastics Encyclopedia (Chemical Week Publishing, NY). All these additives have to be compatible with the system. The formulations may also comprise of opacifiers, such as high index materials (refractive index greater than 1.8), such as particles of titanium oxide P25 from Evonik, Newark, Del. To reduce the effect of UV damage from materials coming in contact with titania or other active semiconductors that upon UV absorption create active centers, one may use those materials where the surface of these particles are covered by a thin inert coating. For example, titanium oxide particles R960 from Dupont in Wilmington, Del., are covered with an inert coating of silica-alumina. To reduce viscosity of the formulation during the processing of coatings, one may add low viscosity solvents like acetonitrile, acetone, methyl ethyl ketone, methanol, ethanol, ethyl and butyl acetates, toluene, xylenes, etc. which are removed later. In those devices where separate electrochromic layers on the conductive electrodes are used, one may or may not use the EC dye in the electrolyte. Processing aids and thixotropic agents (e.g., fumed silica) may also be used.

Exfoliation of clays typically requires high shear and an appropriate liquid medium with salts. Typically one starts out with a liquid medium that may not have all the final ingredients or even none of the ingredients of the electrolyte and then these are gradually replaced by electrolytic ingredients without introducing a process where the exfoliated clay is dried by itself. The purpose is to shear the weaker planes apart that are held together by ionic bonding of monovalent ions (typically, $Na^+$ and $K^+$) and even substitute some of these ions if they may cause unnecessary reactions in the finished device. For clays with these ions a starting liquid medium is aqueous. Some clay products such as Cliosite® (available from Southern Clay Products, Gonzales, Tex.) are available where a hydrophobic organic ion has been substituted between the silica layers. If these clays are used then a hydrophobic liquid medium is used for exfoliation. Usually the term "solvents" is used for materials in this disclosure that are added for ease of processing and are later removed, whereas "plasticizers" are those liquid materials which remain in the product, e.g., the electrolyte.

One way is to add the clays (e.g., Cliosite®) to a liquid medium, such as a medium comprising of an ionic liquid and then process them under high shear until the clays are exfoliated and substituting the native cation holding the planes with the cation of the ionic liquid. An alternate route may be to use a salt with a cation similar to that of the ionic liquid which will be eventually used in the electrolyte layer. This clay may be isolated in the wet state by centrifuging the solution and optionally washing it in a solvent. This is to largely remove the original hydrophobic cations that were present in the clay, so that these do not cause any side reactions in the electrochromic system. In case it is determined that such ion will not interfere adversely with the device properties, these may be left in the solution and the isolation process described above may not be necessary. Another method is to start with an aqueous dispersion of clay which still has native sodium and or potassium ions holding the silicate sheets. A water compatible salt may be added to this which has the same cation as the ionic liquid to be used in the device, e.g., 1-methyl 2-butyl pyrrolidinium bromide is soluble in water whereas an ionic liquid of this cation with $(CF_3SO_2)_2N^-$ is not water soluble. Under high shear, as the clay is exfoliated, sodium is replaced by the above cation. The concentration of the 1-methyl 2-butyl pyrrolidinium cation in the starting solution would determine the extent of replacement of sodium, with higher concentrations leading to higher sodium replacement. The exfoliated product may also be isolated (e.g., by centrifugation), washed with water and again exfoliated in a solution of 1-methyl 2-butyl pyrrolidinium bromide. Repeating this process as many times as needed to get the desired degree of conversion. After the process is over, the product is then redispersed in an electrolytic solvent that preferably comprises ionic liquid. Hydrophobic ionic liquids using the above pyrrolidinium ion are formed by many anions, and some of these are $(CF_3SO_2)_2N^-$, $(CF_3CF_2SO_2)_2N^-$, $(CF_3SO_2)_3C^-$, and $PF_3(C_2H_5)_3^-$. It is preferred that the ionic liquid used has the same cation as the one used to replace the native cation in the layered sheets.

Another method of exfoliation is given in US patent application 2008/0009568. The clays are exfoliated in one solvent and then a second compatible solvent is added while maintaining the state of exfoliation. Since the second solvent has higher boiling point the first solvent is removed while still maintaining exfoliation. Then materials (including polymers) compatible with the second solvent only are added in preparation for a composite material.

Yet another method to form these composites is as given in U.S. Pat. No. 4,875,762 where a polymer is added to the solution and under high shear the clay is exfoliated. The product is then washed (without removing the polymer) and dried, which is then pulverized. This can then be mixed with dyes and solution and re-dispersed, as the presence of polymer chains between the nanodiscs in the earlier step makes it easily fragmented or redispersed into the nanodisc form.

One of the application that this technology can yield are inexpensive printed EC displays, where the electrolyte is either laminated between the two conductive substrates as shown in FIG. 1, or all the layers are sequentially deposited on one substrate, and the top substrate 10 can be an encapsulation layer. Since these devices cannot be hermetically sealed at a reasonable cost, it is better to make these out of hydrophobic materials that are not affected by the environmental moisture. In addition, any plasticizers used in these devices can also evaporate changing the performance of the devices. Thus, it is strongly preferred to use ionic liquids as plasticizers as these have negligible vapor pressure. In addition, it is also preferred that these ionic liquids be hydrophobic, and one makes use of dyes polymers and other ingredients in the electrolytes that are also hydrophobic and compatible with the ionic liquid.

Some of the preferred hydrophobic ionic liquids for the devices of this invention are those that are formed by the following anions and cations. The preferred anions for either the ionic liquids, inert salts (e.g., lithium salts) or the electrochromic dye salts are bis(trifluoromethylsulfonyl)imide ($(CF_3SO_2)_2N^-$), bis(perfluoroethylsulfonyl)imide ($(CF_3CF_2SO_2)_2N^-$) and tris(trifluoromethylsulfonyl)methide ($(CF_3SO_2)_3C^-$), tris pentafluoroethyl-trifluoro phosphate ($PF_3(C_2F_5)_3^-$). Non fluorine containing preferred anions are alkyl sulfates (e.g. $C_2H_5SO_4^-$) and tetracyanoborate. The preferred cations for the ionic liquid include quaternary ammonium, where more preferred quaternary ammonium cations are pyridinium, pyridazinium, pyrrolidinium, pyrimidinium, pyrazinium, imidazolium, pyrazolium, thiazolium, oxazolium, triazolium, tetraalkylammonium, N-methyl morpholinium, cations of the formula $[(CH_3CH_2)_3N(R_1)]^+$, wherein $R_1$ is alkyl having 2-10 carbons, cations of the formula $[(CH_3)_2(CH_3CHCH_3)N(R_2)]^+$, wherein $R_2$ is alkyl having 2-10 carbons, cations having the structural formula wherein $R_3$ is alkyl having 2-10 carbons, and cations having the structural formula wherein $R_4$ is alkyl having 2-10 carbons.

Although EC devices can be formed using electrolytes of this invention, where both EC and electrolytic properties are combined in a single layer, one may also form devices where redox EC electrodes are used as discussed later. Single layer devices (shown in FIG. 1 where only one active EC/electrolyte layer is used bridging the two opposing conductors) are of particular interest in indicators and the displays which can be fabricated at low cost.

The chemistry of single EC layer devices also include those devices where the voltage application generates a species at the electrode, which can react with components in the electrolyte to form a color. Typically this may generate acid or other species as given in US patent application 2008/012707 and U.S. Pat. Nos. 6,879,424, and 7,054,050. The EC layers may be prefabricated as a sheet and then laminated between two conductive substrates (e.g., see provisional U.S. patent application 60/998,758). These may be deposited (or formed) on one conductive substrate and then laminated by another conductive substrate, or another conductive layer is deposited on top of this electrolyte layer. One may also deposit these electrolytes on patterned electrodes where the opposing electrodes are on the same substrate (e.g., interdigited electrodes). Details of forming such layers and their incorporation in EC devices will be discussed in more detail below. Further, it is preferred that these layers include hydrophobic ionic liquids and may also include non-ionic plasticizers. The EC properties in the single layer devices are derived from separate anodic and cathodic dyes or from those where anodic and cathodic dye moieties are coupled in a single molecule. EC properties may also accrue by a reaction of a redox species with a dye that results in coloration. These layers will also comprise of other additives and solvents as discussed earlier. However, to keep the discussion focused, some of the additives may be omitted from the immediate discussion.

Many displays and indicators use interdigited or planar devices. The advantage of this is that both opposing electrodes are deposited on one substrate, and then the EC electrolyte is deposited to finish the functional part of the device. These devices are described in many publications, but preferred configurations as those described in U.S. Pat. No. 5,852,509; U.S. provisional applications 61/025,069; 61/168,421 and published US patent application 2008/012707 which are all incorporated herein by reference.

An example of a process is described to make an electrolyte which may be deposited by printing to form either sandwich type of device or a planar device. Laponite D (available from Southern Clay Products), a synthetic magnesium silicate clay which has been surface modified with fluoride ions, is exfoliated in an aqueous solution using a water soluble salt of the cation that would be later used as the cation of the ionic liquid (e.g., 1-methyl 2-butyl pyrrolidinium bromide). This may be sheared at high rates of mixing for several minutes to many hours until a clear consistent solution is obtained or at least the cation in the clay material has been exchanged. The solids are collected by centrifugation and washed in water and or acetone and dried. This is redispersed in the ionic liquid (e.g. 1-methyl 2-butyl pyrrolidinium $(CF_3SO_2)_2N^-$) under shear. An EC dye such as bridged anodic and cathodic dye (ferrocene-viologen or phenazine-viologen combination) is added. One may also add separate anodic and cathodic dyes, but it is preferred to add dyes that have large cations to increase their transportation times through this electrolyte when placed in the device. One way to increase the size is to link the anodic and the cathodic moieties in a single molecule or attach the dyes to polymers. Non exhaustive examples of the bridged dyes may be found in several publications, e.g., U.S. Pat. Nos. 5,179,467; 5,563,273; 6,241,916; 6,519,072; 6,767,481; 6,961,168; 6,853,472, examples of dye attached to polymers are in U.S. Pat. No. 6,420,036 and PCT application WO 08/0,222,966. It is preferred that the dye cation has a molecular weight in excess of about 500. Further, it is preferred that each of the anions and the cations of one of the ionic liquids (if several are used) be below 500 in their molecular weights. A compatible polymer is added to serve as a binder, (e.g., polyurethane, acrylic, or a fluorinated polymer), e.g. Solef 21216/1001 available from Solvay (Thorofare, N.J.)) is compatible with the above ionic liquid. Additional solvents such as acetonitrile may be added to ensure that the viscosity of the solution can be mixed under high shear and that it can be coated to result in a solid coating (i.e., after removing the solvent or any other volatiles). The dry thickness range of most electrolytic coatings is about 0.5 to 50 microns. More polymer examples (or polymerizable monomers) can be found in US patent application 2008/0074724 and in U.S. Pat. No. 7,119,937; and dye examples in U.S. Pat.

Nos. 5,910,854; 5,140,455; 6,016,215 and 6,961,168 which are enclosed herein by reference. In a planar device, after the electrolyte coating is deposited, an encapsulation film may be laminated under heat and pressure to bond with the electrolyte layer or an additional layer may be used (e.g., polyvinylbutyral or polyvinyl acetate). Additional perimeter sealants may also be used. Rather than using a lamination process, one may also deposit (coat or print) another coat for encapsulation. This coat may also comprise of disc shaped nanoparticles to limit diffusion. The encapsulation coating thickness may be from about 1 to 100 microns. It is preferred that the encapsulating layer is not compatible with any of the ionic liquid or plasticizer present in the electrolyte so that it is not wicked, and preferably is deposited from a solvent or a curable formulation so that it does not solubilize any of the electrolytic components.

To make a sandwich device the electrolyte is deposited on a conductive substrate. The electrolyte layer is dried or cured and then a conductor is deposited on top of this electrolyte. This may be done by a direct deposition of a conductive layer on the electrolyte or by laminating another substrate which is either conductive or has a conductive coating disposed on it. At least one of the conductors, i.e., one on the starting substrate or the one deposited on the electrolyte needs to be transparent. For some applications it may be preferred that all the layers of the device be formed by a printing process to make inexpensive devices, particularly for use as low-cost displays and indicators. The electrolytes as discussed above can be deposited by many different processes including printing, spraying, roller coating etc. Clearly, the formulation will have to be modified for each process particularly to control the viscosity, surface tension (e.g., may be modified by adding surfactants), solids content, drying characteristics, etc.

For transparent conductor, ITO and doped zinc oxide coatings may be used, however, conductors may also be deposited by printing, for example from solutions of conductive nanowires or nanoparticles. Typically these nanowires and nanoparticles are made out of carbon, metals and conductive oxides. The first two are more preferred as the conductors are flexible. Some of the preferred metals are copper and silver, and alloys comprising these (see U.S. provisional application 61/078, 328 for alloys and their use in devices, and this application is included herein by reference). As an example, the melting point of nanoparticles decreases rapidly below 50 nm due to increased surface area. Inks with nanoparticles of silver and gold are formulated with particle sizes below 10 nm so that after printing these can be melted at low temperatures to produce conductive lines and coatings. Their melting point is below 200 C and these may be also laser sintered (e.g., such inks are available from UT Dots Inc (Champaign, Ill.)). For example Cambrios (Mountainview, Calif.) has developed solutions and technology where metal nanowire materials may be deposited for transparent conductors. For displays such conductors can be easily patterned, where these are mixed with curable polymers or are coated with curable polymers. These polymers are cured by radiation (e.g., UV light), when exposed through a mask. All of the non-exposed areas, i.e., non-cured areas are washed away with a solvent. For those devices that have to be made by printing technologies, such conductors may be used for interdigitated devices and also for the conductive layer for the starting substrates. For imparting good durability and lifetime to the displays, these conductors should have high corrosion resistance.

In order to tune the persistence time of the displays made by electrolytes with EC properties, one can vary the composition of the electrolyte, particularly, the amount and the aspect ratio of the disc shaped nanoparticles, the size of the dye, plasticizers and added salts. Higher amount of nanoparticles and higher aspect ratios will lead to longer persistence times. In addition, changing the dye molecule to a larger size will do the same. As an example, the dye molecule may be attached to a polymer. Increasing plasticizer within the electrolyte may provide more mobility, and hence shorter times. Use of plasticizers that are polymeric (e.g., polyethylene glycols and polypropylene glycols) or have higher dielectric constants may also increase the persistence times. Increasing the electrolyte thickness (or spacing between interdigited electrodes), or increasing dye concentration will also result in increased persistent times. Typical loading on nanodiscs in processed electrolytes will range from about 0 to 20%, however, their concentration in the formulations that will be used for printing or coating will be typically less than 5% so that the processing viscosity is tractable.

In addition to the electrolytes, novel EC electrodes may be formed by using such nanoparticles. Electrochromic devices may be fabricated where these nanoparticles are used in at least one of the electrodes (electrochromic or ion-storage) or the electrolyte. The ion-storage electrode is also called a counterelectrode and may also be electrochromic. In this case, when the electrochromic electrode colors by reduction then the counterelectrode simultaneously colors by oxidation. In many EC devices solid electrodes are used as EC layers and counterelectrodes. The electrodes color and bleach by insertion or extraction of small ions such as $H^+$, $Li^+$, $Na^+$, $K^+$, $BF_4^-$, $ClO_4^-$, $N(CF_3SO_2)_2^-$, etc. The kinetics of these devices and their efficiency is dependent on the transport properties of these ions and the surface of the EC materials available for the ions to interact. Some examples of EC reactions with tungsten oxide (crystalline or amorphous) and polyaniline are:

$$WO_3(bleached) + yM^+ + ye^- \rightarrow M_yWO_3(colored)$$

$$\sim[(C_6H_4)NH]\sim(bleached) + zX^- - ze^- \rightarrow [(C_6H_4)NH].X_z \text{ (colored)}$$

"M" is usually H, Li, Na, K and "X" is Cl, Br, I, $ClO_4$, $BF_4$, $N(CF_3SO_2)_2$, etc. Further for good reversibility both, y and z are usually less than 1. As shown, tungsten oxide colors on reduction and polyaniline on oxidation. Typically these coatings are used in very thin layers, generally less than one micron in thickness. Another way of forming the electrodes is by using particles of electrochromic material with a binder. These particles may be nanosized or may be larger. Also one may use particles (preferably conductive particles such as of antimony doped tin oxide or tin doped indium oxide) wherein these are coated with electrochromic materials. The binder used for forming electrodes usually is a material with ion conductive properties so that the ions from the electrolyte can travel deep into the layer and interact with the electrochromic material. Nanosized conductive particles are expensive and not too conductive to provide high conductivity in thick layers. As discussed below one may use a modification to the composition of these electrodes to enhance electronic conductivity. This would allow to use non-conductive particles such as clay nanodiscs which are not expensive.

One may use these nanodiscs as substrates for coating EC materials and counterelectrode materials and then use these particles along with a binder to form EC electrodes or counterelectrodes that function by reduction or oxidation (redox). Since there are large distances between dispersed particles (comparing to atomic packing of crystals of EC materials), the ions can travel fast in the binder. Further, a large surface area of the EC materials is exposed which is available to the ions for reduction and oxidation. Both of these effects enhance the EC properties of the layers, and hence the devices by making them color deeper and faster. The proportion of the clay to the EC materials for coating may be calculated by the following example. Montmorillonite clays when exfoliated may have 700-800 sq meters of surface area per gram of material. If these need to be coated with 1 nm thick amorphous tungsten oxide, one would require about 4 grams of tungsten oxide (assuming a density of 5.5 g/cm$^3$) for each gram of exfoliated clay. The desired average EC coating thickness on the particulates is preferably in the range of about 1 to 5 nm. Some of the "other EC oxides" are $MoO_3$, $V_2O_5$, $Ir_2O_3$ and NiO. These may have other dopants such as Li, Na, K, Mn, Cr and Co, etc. Of these "other EC oxides" $MoO_3$ colors on reduction and the others on oxidation. EC materials may be amorphous or crystalline. Some of the other popular EC polymers are polythiophene, polyviologen, polypyrrole, polyaniline and their derivatives and blends. In an EC device one may use first electrode that colors by reduction and the second or the opposing electrode that colors by oxidation so that both simultaneously color and bleach resulting in high efficiencies (more coloration for the same charge consumed). The use of thin nanoparticle discs can create channels for small ions to move rapidly, and/or provide large surface area of the EC material for these ions to interact.

For coating nanoparticles with electrochromic materials, sol-gel or more broadly described wet-chemical methods may be used. Preparation of precursor solutions and deposition of inorganic oxide EC coatings from these are given in U.S. Pat. Nos. 5,277,986; 5,457,218 and 5,525,264. In these, precursor solutions are made in solvents which are then coated on the substrate. When these coated substrates are heated, the precursors decompose or react to form the coatings of EC materials. Exfoliated clay solutions can be prepared separately in aqueous or alcoholic solutions and mixed with EC precursor solutions. The solutions comprising EC precursors and the nanoparticles are coated on the substrates and then on heating the EC oxide is formed around these particles. Another way is where these solutions comprising exfoliated particles and EC precursors are dried and heated so that composite powders of the nanoparticles coated with EC oxides are formed. These are re-dispersed in a solution to which salts (e.g., lithium salts or even organic EC salts) are added along with a polymer (binder and an ion conductor), optional plasticizers, and then coated on the substrates. In a more specific example an electrode with amorphous lithiated tungsten oxide comprising EC material may be made. One method is to start with a clay such as Cliosite® 30 and adding it to the coating solution (e.g., tungsten peroxyester solution with lithium ethoxide as described in U.S. Pat. No. 6,266,177) and exfoliating under high shear. The viscosity may have to be adjusted in order to meet the coating requirements. The solution may be coated and then heated under humidity and temperature (as specified in U.S. Pat. No. 6,266,177) to form the coating on a substrate, or the solution is dried and heated to form the EC material, which is then redispersed in the solvent with binders and other additives for coating or printing.

In a similar way conductive polymers may also be used to coat nanodiscs to be used as EC electrodes. Coatings of these may be directly electro-polymerized on the substrates and the silicate discs get embedded in the coating as it forms on the substrate. An EC electrode may be formed from solutions of exfoliated nanoparticles dispersed in an electrochromic conductive polymer solution. Solutions of such polymers are available under the product name of Clevios® e.g., grade P from HC Starck (Newton, Mass.). The ratio of the dry EC material to dry clay should be calculated as given earlier for tungsten oxide to obtain coated nanoparticles with the right thickness. One may also coat the nanoparticles with the EC material and then separate these as solids and then this is redispersed in another solution with salts and polymers (usually ionic polymers or those that are used for ion conduction, such as polyethers) and then coated. All of the coating solutions may have several other components, some of these are UV stabilizers, surfactants, opacifiers (e.g., titania), conductive nanowires (to add electronic conductivity to the electrode coatings), surfactants, viscosity modifiers, other co-solvents, tackifiers, monomers and reaction promoters (for those where polymerization needs to be done after the coating operation).

In all cases where the composites of the nanoparticles and the EC material are redispersed in another medium for coating, the mediums will comprise of binding materials, plasticizers and other additives. Typically the binding material is chosen as a polymer that is transparent (not strongly absorbing or reflective) which are typically not electronically conductive. It may provide ion conduction by itself or in conjunction with the other additives. However, within the electrode it is important to have both electronic and ionic conductivity as for redox processes both are needed. To impart electronic conductivity to the redox electrodes it is preferred to add conductive nanorods or nanowires, as these can form a network or percolation threshold at low concentrations. These may be less than 5% in volume of the electrode. More details on these materials is provided below.

Figure 2:
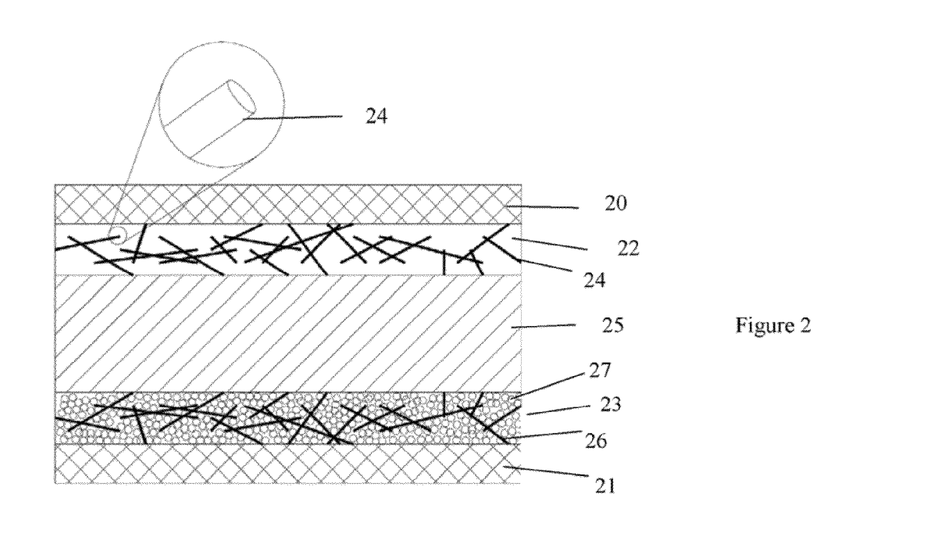
FIG. 2: Schematics of an EC device formed by using nanowires in the electrochemical electrodes.

FIG. 2 shows an electrochromic device which shows two conductive electrodes 20 and 21. At least one of these conductors is transparent. The EC electrodes (or one EC electrode and a counter electrode) are shown as 22 and 23 and these are in contact with an electrolyte layer 25. Electrode 22 shows an electrochromic material which comprises of electronically conductive nanowires (24), one of which is also shown in the inset after magnification. These nanowires form an interconnected mesh throughout the electrolyte and also touch the conductor 20. Thus, these wires impart electronic conductivity throughout the matrix and improve the performance efficiency of the electrode. Electrode 23 comprises of particles (27) which are electrochromic and are bound together with a binder which is generally ion conductive. This electrode also shows that it has a network of electronically conductive nanowires 26. Since nanowires are thin, these are still optically transparent. Further, the electrochromic particles in electrode 23 may be large particles, or nanoparticles and may be of any shape. These particles may be rod like, spherical, disc like cubes, etc. It is not necessary that conductive nanowires be used for both electrodes, as an example if the electrolyte is opaque for a display use, and all the visual change is coming from layer 23 as one looks through the substrate 21, then one can use a carbon based counterelectrode as layer 22 which may have sufficient electronic conductivity. In addition it is also possible to eliminate one or both of the conducting layers (i.e. 20 and 21) as highly conductive nanowires will be able to carry the current through the network once these are connected from the edges. For example the EC device described in U.S. Pat. No. 7,508,009 may have an enhanced performance if conductive nanowires are added to the electrodes.

Particularly, when the EC materials are non-conductive (electronically), as demonstrated below, conductive nanowires may be added to such coatings providing them the electronic conductivity to function efficiently. EC electrodes may be formed using EC dyes. Most EC dyes such as viologens, ferrocene, phenazine, anthracene, phenothiazine, etc, are non-conductive. These may be incorporated in dye solutions, with binders, etc., and with conductive nanowires to form coatings that are both electronically and ionically conductive. In the past, nanoparticles have been used to make electrodes with the dyes coated or anchored on to the surfaces of these particles. Specifically, semiconducting particles such as titania (see U.S. Pat. Nos. 6,301,038 and 7,372,609), are used and the dyes are covalently bonded to the surfaces of these particles. These particles are then coated on to the substrates to yield the EC electrodes. Addition of conductive nanowires to such systems can result in conductive electrodes at only small concentration as these can achieve a percolation threshold. One can also add these nanowires to the electrodes that are formed by electrochromic semiconducting particles. Another preferred method is where the dyes are covalently attached to these conductive nanowires, and then used as electrodes as one of the ingredients in the electrodes along with binding polymers, plasticizers, opacifiers, etc. The nanowires have a diameter of usually less than 100 nm, but preferably less than 50 nm, typical average diameters range from about 1 to 30 nm. Their length is usually longer than 1000 nm and may be up to 50 µm long. Preferred nanowires are made out or carbon or metals. The most preferred are carbon nanowires (also called tubular bucky balls) which may be single walled, double or multiwalled. Unlike titania, these can absorb UV and provide stabilization to the dye. Carbon nanowires are also available with surface functionalization with groups such as —COOH, —$NH_2$ and —OH from Nanolab (Newton, Mass.) or those with polyethylene glycol and mercaptan groups from others. Some of these are also available in matrices such as curable epoxy resins, to which the dyes may be attached easily. Other suppliers of functionalized nanotubes are Nano-Carblab (Moscow, Russia), NanoCS (New York, N.Y.), Nanocyl (Rockland, Mass.). Both, the U.S. Pat. Nos. 6,301,038 and 7,372,609 list a number of ways to functionalize the dyes, which is all included herein by reference. These functionalized dyes can be easily attached to the above functionalities on the nanowires, some of the preferred functionalities for the dyes are carboxylic, isocyanate, epoxy, silane (e.g., methoxy and ethoxy silanes). Depending on the concentration of the nanowires and the other ingredients one may obtain transparent or opaque electrodes. As discussed earlier, one can coat disc shaped or any other shape particles with conductive polymers or EC metal oxides and isolate these powders. These may be coated/printed to form the electrodes by re-dispersing in solutions where the matrix may be ionically conductive but lack electronic conduction. One can also add conductive nanowires to these ink formulations, or to any EC formulations where the matrix is non-conductive (electronically non-conductive) and the ink particles needs to be in electronic communion with the conductive substrate.

Many of the preferred electrolytic compositions comprising hydrophobic ionic liquids do not interact with common packaging materials such as paper, polyvinyl chloride, polystyrene, polycarbonate, polyester, acrylic and polyolefins. Thus, they can be used for labels and indicators for a wide variety of consumer products and packages and are durable in performance. These displays should be preferably energized at lower than 5V, preferably lower than 2V. The average current consumed should be less than 20 mA/$cm^2$, preferably lower than 3 mA during the period in which the displays are powered. Further, it is also preferred that the displays be powered in less than 10 s, and preferably in less than 2 s. The persistence time (i.e., the time for which the information is displayed after the power is removed) may be tunable based on the composition of the electrolyte or the electrode from about a few seconds to in excess of several days.

Figure 3:
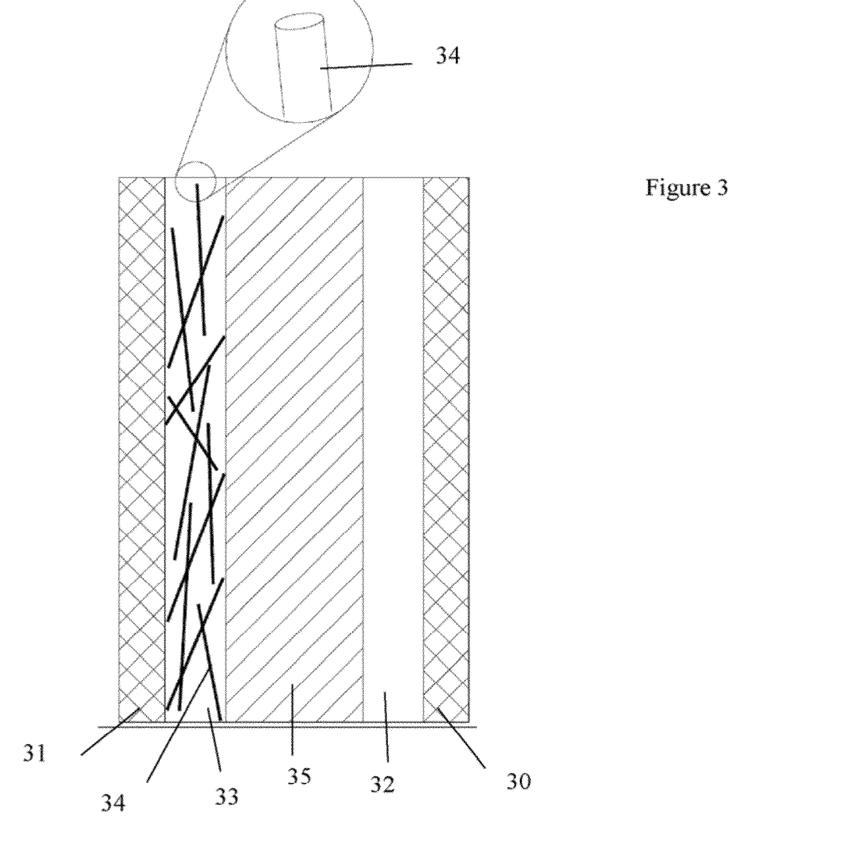
FIG. 3: Schematics of an actuator with nanowires in the redox electrodes.

Electrochemical Actuators:

An important issue in these actuators is the thickness of the electrodes. Thicker electrodes result in higher forces, but since the electronic conductivity of these materials is limited, it can compromise their performance. FIG. 3 shows a cross-section of an electrochemical actuator (also called artificial muscle or electrically actuated polymer device). 30 and 31 are conductive substrates, which could even be conductive metal foils or coatings to which the electrical connections are made to and also protect the device from the environment. These are in contact with the two redox electrodes 32 and 33 which are separated by an electrolyte 35. The electrode 33 shows a network of conductive nanofibers (34). These nanofibers provide an electronic network throughout this electrode. One may also use the conductive nanofibers in electrode 32 (not shown). The reason of use of nanofibers in actuators is not usually as important from a transparency perspective, but it provides a network where any redox material in the matrix is not too far off from the conductive path.

Exfoliated clays may also be used to reinforce redox electrodes and electrolytes in these actuators as discussed above to impart superior mechanical properties. The reinforcement increases their strength and/or modulus while still keeping high elongations. In this application when the power is applied a change in shape/size occurs in devices using these polymers. These polymers are actuated when the redox electrodes are either reduced or oxidized (e.g., conductive polymers such as polyaniline, polypyrrole, polythiophene) by insertion and extraction of large ions respectively, or these may be the other types such as ion exchange membranes, persulfonated sulfonic polymers, electrostrictives, electrostatics and piezoelectrics.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An electrochromic device comprising of opposing conductive electrodes, and an electrolyte layer disposed between the said electrodes, wherein disc shaped nanoparticles are present in the said electrolyte layer.

2. An electrochromic device as in claim 1 which uses an electrochromic dye in the electrolyte.

3. An electrochromic device as in claim 1 wherein the disc shaped nanoparticles are formed by exfoliating layered silicates.

4. An electrochromic device as in claim 1, wherein the said electrolyte comprises at least one of an electrochromic dye, ionic liquid and a polymer.

5. An electrochromic device comprising a pair of electrodes separated by an electrolyte layer, wherein one of the said electrodes comprises an electrochromic material, an ion-conductive binder and conductive nanowires, and the said electrode is deposited by a printing process.

6. An electrochromic device comprising opposing conductive electrodes, and an electrolyte layer disposed between the said electrodes, wherein one of the said electrodes comprises disc shaped particles coated with an electrochromic material.

7. An electrochromic device as in claim 6, which further comprises conductive nanowires.

8. An electrochromic device comprising a pair of electrodes separated by an electrolyte layer wherein one of the said electrode comprises of an electrochromic material and conductive nanowires, and wherein the said electrode and the electrolyte are deposited by a printing process.

9. An electrochromic device comprising of opposing conductive electrodes, and an electrolyte layer disposed between the said electrodes, wherein one of the said electrodes has conductive nanowires, a redox material and a monomer which is polymerized during the processing of this layer.

* * * * *